(12) United States Patent
Atwood et al.

(10) Patent No.: US 7,901,750 B2
(45) Date of Patent: Mar. 8, 2011

(54) PROGRESSIVE THICKNESS ANTI-LEAK BARRIER COATING

(75) Inventors: Mark T. Atwood, Keizer, OR (US); Russell A. Monk, Salem, OR (US); Thomas S. Ohnstad, Salem, OR (US)

(73) Assignee: High Impact Technology, L.L.C., Tigard, OR (US)

( * ) Notice: Subject to any disclaimer, the term of this patent is extended or adjusted under 35 U.S.C. 154(b) by 106 days.

(21) Appl. No.: 11/416,982

(22) Filed: May 2, 2006

(65) Prior Publication Data

US 2006/0257595 A1  Nov. 16, 2006

Related U.S. Application Data

(60) Provisional application No. 60/677,872, filed on May 4, 2005.

(51) Int. Cl.
 *B05D 5/00* (2006.01)
 *B32B 1/02* (2006.01)
 *F17C 3/00* (2006.01)

(52) U.S. Cl. ............. 428/34.1; 220/560.01; 220/560.02; 427/256; 427/261; 428/35.7; 428/911; 428/912

(58) Field of Classification Search ................. 428/34.1, 428/912, 35.7, 911; 427/261, 454, 470, 97.1, 427/256, 421; 220/560.01, 560.02, 900
See application file for complete search history.

(56) References Cited

U.S. PATENT DOCUMENTS

| | | | |
|---|---|---|---|
| 2,403,836 A | 7/1946 | Wagner | |
| 2,605,138 A | 7/1952 | Paasche | |
| 3,606,154 A | 9/1971 | Tufts | |
| 3,664,904 A * | 5/1972 | Cook | 428/102 |
| 3,676,197 A | 7/1972 | Harrison et al. | |
| 3,698,587 A | 10/1972 | Baker et al. | |
| 3,968,279 A | 7/1976 | Brown et al. | |
| 4,007,246 A * | 2/1977 | Bailey | 264/129 |
| 4,129,225 A | 12/1978 | Bailey | |
| 4,197,092 A | 4/1980 | Bretz | |
| 4,216,803 A | 8/1980 | Hall | |
| 4,341,817 A | 7/1982 | Tozier et al. | |
| 4,422,561 A * | 12/1983 | Grosvenor et al. | 220/560.02 |
| 4,678,692 A | 7/1987 | Porter | |
| 5,306,867 A | 4/1994 | Connole et al. | |
| 5,456,114 A * | 10/1995 | Liu et al. | 73/597 |
| 5,472,743 A | 12/1995 | Daluise | |
| 5,490,631 A * | 2/1996 | Iioka et al. | 229/403 |
| 5,500,274 A | 3/1996 | Francis et al. | |
| 5,855,747 A | 1/1999 | Lusk | |
| 6,040,356 A | 3/2000 | Kanki et al. | |
| 6,117,488 A * | 9/2000 | Erickson | 427/261 |
| 6,294,235 B1 * | 9/2001 | Detoumay et al. | 428/35.7 |
| 6,432,882 B1 | 8/2002 | Yamamoto | |
| 6,803,400 B1 | 10/2004 | Butterbach et al. | |
| 7,169,452 B1 | 1/2007 | Monk et al. | |
| 2005/0084334 A1 | 4/2005 | Shi et al. | |

* cited by examiner

*Primary Examiner* — Brent T O'Hern
(74) *Attorney, Agent, or Firm* — Jon M. Dickinson, Esq.; Robert D. Varitz, Esq.

(57) ABSTRACT

A head-pressure-variant, self-healing, anti-liquid-leak coating for the outside of an upright wall in a liquid container. This coating possesses a thickness which varies from smaller toward larger advancing downwardly along a coated container wall. Preferred embodiments of the coating include: (a) one whose overall thickness varies in a linear way; (b) another whose thickness varies in a staged/stepped manner; and (c) a third whose thickness varies in a smooth, non-linear way. In all embodiments, the coating includes plural layers having interlayer-thickness relationships which are the same throughout the coating.

1 Claim, 1 Drawing Sheet

PROGRESSIVE THICKNESS ANTI-LEAK BARRIER COATING

CROSS REFERENCE TO RELATED APPLICATION

This application claims priority to prior-filed U.S. Provisional Patent Application Ser. No. 60/677,872, filed May 4, 2005, for "Progressive Thickness Anti-Leak Barrier Coating". The entire disclosure content of that prior-filed provisional case is hereby incorporated herein by reference. Reference is also made to U.S. Pat. No. 7,169,452 B1, granted Jan. 30, 2007 to inventors Monk and Ohnstad, two of the inventors named herein, for Projectile Barrier and Method, the full disclosure of which is hereby incorporated herein by reference.

BACKGROUND AND SUMMARY OF THE INVENTION

There has recently been developed a plural layer coating structure which may be applied to the outside surface of a sidewall in a liquid container to bring about rapid self-healing of a puncture wound in that sidewall. That development has been found to offer significant utility in sealing puncture wounds in a container holding combustible petrochemical fuel liquid. The term "container" is used to refer to any structure which holds such a liquid, such a vehicle gas tank, a large depot storage tank, a pipeline, and others. For background purposes, reference is here made to U.S. Pat. No. 7,169,452 —a patent whose underlying application, U.S. patent application Ser. No. 11/067,525, filed Feb. 25, 2005, for "Projectile Barrier and Method", was copending at the time of filing the present application. The basic structure of such a protective coating, which preferably is a three-layer coating, is quite fully described and illustrated in that regular patent application, and as was just mentioned, reference is made to that application to provide the reader with relevant background information.

The present invention addresses the recognition that container-stored liquid has associated with it what is known as head pressure which typically varies linearly and with an increasing value progressing downwardly from the surface of a contained liquid. Further recognizing that a puncture wound at a particular elevation in the sidewall of a container will determine the out-flow pressure relative to a container puncture wound, the present invention proposes a unique anti-leak protective barrier coating which, in three different embodiments, pays attention to this head-pressure consideration through possessing an increasing overall thickness from the upper to the lower potions of a liquid container wall which is to be protected by the coating.

In one preferred embodiment of the invention, the coating increases smoothly and essentially linearly in an increasing-thickness fashion from top to bottom, and in this embodiment of the invention, that thickness, at every vertical point along the wall of a protected container, bears a fixed ratio, or relationship, with respect to liquid head pressure that also varies linearly progressing downwardly in that container.

In another embodiment of the invention, the proposed coating takes the form of smoothly "flowing" progressive but non-linear thickness which might, as an illustration, follow a parabolic curve, a logarithmic curve, or other curve, etc.

In yet a third embodiment of the invention which is illustrated and described herein, the coating of this invention is staged, or stepped, in a fashion whereby, progressing downwardly along a coated wall, one engages "units" of coating which have a defined height, and within that defined height, a substantially uniform thickness. As one progresses down the wall of a container with respect to this embodiment, one engages progressively thicker units of the type just generally described.

Accordingly, the invention provides an opportunity for one to implement a protective coating of the style intended which uniquely relates its protective-coating thickness to expected stored-liquid head pressure within a protected container.

These and other features and advantages of the invention will become more fully apparent as the description which now follows is read in conjunction with the accompanying drawings.

DESCRIPTION OF THE DRAWINGS

FIG. 1 illustrates, in solid lines, a structure wherein the ratio T/HP remains substantially constant at all elevations along the pictured container wall.

In dash-double-dot lines, FIG. 1 illustrates one modified form of the invention, wherein coating thickness varies in what is referred to herein as a smoothly progressive, non-linear way, and very specifically in a curving manner which is logarithmic in nature.

DETAILED DESCRIPTION OF THE INVENTION

Figure 1:
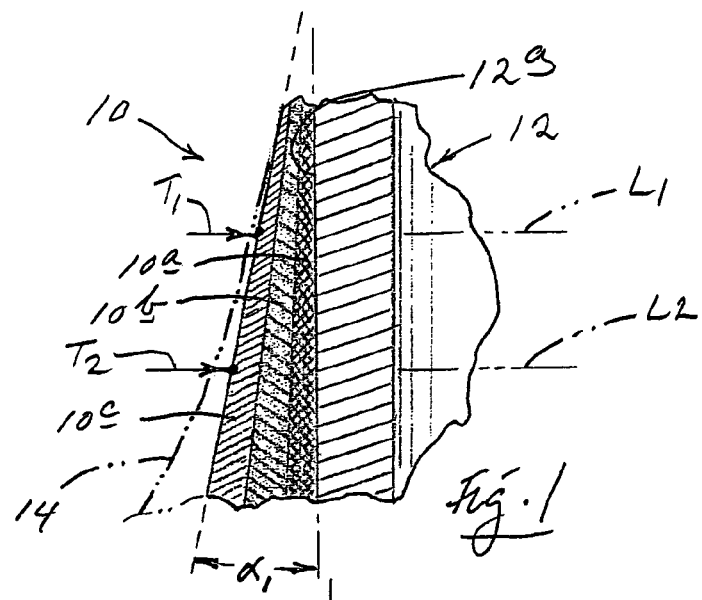
FIG. 1 shows, in solid lines, a preferred and best mode embodiment of the protective coating of this invention whose thickness grows larger progressing smoothly and vertically downwardly along a protected container wall, thus to relate coating thickness T, in a vertical positional sense, generally to expected internal liquid head-pressure HP, in the same vertical positioning sense. In particular.

Turning now to the drawings, and referring first of all to FIG. 1, indicated generally at 10 in solid lines, including three different characters of bounded shading lines, is a smoothly linearly thickness-tapered, anti-leak protective barrier coating which has been applied to the outside surface 12a of a liquid container 12 which contains a body of petrochemical fuel (not shown). Two specific levels within this body of liquid are illustrated by dash-double-dot lines $L_1$ and $L_2$ marked adjacent the right side of FIG. 1.

Coating 10 includes three layers 10a, 10b and 10c which are generally formed in accordance with the teaching of above-referred-to, U.S. Pat. No. 7,169,452. Layers 10a and 10c are formed of an appropriate high-elastomeric material, such as the product sold under the trademark TUFF STUFF®FR (with the letters FR standing for fire-resistant), made by Rhino Linings USA, Inc.—a company based in San Diego, Calif. TUFF STUFF® 7FR is a polyurethane material provided in the form of a water insoluble, yellow/gold liquid. It is a combination of TUFF STUFF® A-SIDE (40% by weight) and TUFF STUFF® B-SIDE FR SLOW (60% by weight). TUFF STUFF® A-SIDE includes 4, 4' diphenylmethane diisocyanate (4, 4' MDI), modified MDI and diisocityl phthalate, where MDI is methylene diphynylene diisocyanate. TUFF STUFF® B-SIDE FR SLOW includes glycol and glycol/EO/PO polymer, where EO is ethylene oxide and PO is propylene oxide, both of which are non-ionic surfactants. Layer 10a is applied directly to the outside surface 12a of container 12, and layer 10c is applied to the outside surface of an intermediate layer 10b.

Layer 10b is formed with a body of the same elastomeric material just mentioned which is employed singularly in layers 10a, 10c, combined with an embedded population of liquid-imbiber beads (not specifically shown)—a bead product known as IMB230300, and made by Imbibitive Technologies America, Inc. in Midland, Mich. The imbiber beads are solvent soluble, water insoluble alkylslyrene copolymer and up to 1% Kaolin clay,—a static retardation material. The beads are solid polymer spheres of between about 125-μ to about 420-μ, having a density of about 40-lbs/ft$^3$.

As explained in the '525 co-pending patent application, all of these materials that are used to form coating 10 are applied by spraying. The sprayed elastomer material exhibits a high degree of elastic elongation capability before breakage of up to about 400%. The liquid-imbiber beads have been chosen because of their strong affinity for rapidly absorbing (imbibing) hydrocarbon fuel, an action which causes them to swell in volume and coagulate as a consequence. These beads, and the same is somewhat true with respect to the mentioned elastomeric body material, are rapidly reactive to contact with hydrocarbon fuel, and this reaction, coupled with the stretchiness of the elastomeric body material, results in this layer quickly functioning to seal a puncture wound, such as a bullet wound, in the sidewall of a container, such as the sidewall in container 12.

Further discussion about the operation of these materials with respect to sealing such a puncture wound is found in the text of the '525 patent application.

Although different relative layer thicknesses can be chosen for layers 10a, 10b, 10c in coating 10, for the purpose of illustration herein, it will be assumed that at every elevation along container 12, layers 10a, 10c have about the same thickness, which thickness is about twice that of intermediate layer 10b at the same elevation. This layer-thickness relationship is not drawn to scale n FIG. 1, but is so drawn in FIG. 3 which will later be discussed. What will be noted with respect to the embodiment now being described is that the particular thickness T of layer 10 (shown at locations $T_1$ and $T_2$ in FIG. 1, and at one location T in FIG. 3), at every elevation along the outside of container 12, will have a fixed and consistent ratio, or relationship, with respect to the contained-liquid head pressure (HP) at that same elevation. And so, speaking about this a bit more specifically, at the two points $P_1$ and $P_2$ shown in FIG. 1 which reside on the outside of layer 10 at elevations $L_1$ and $L_2$, respectively, the ratio T/HP is identical at both of these locations. It is also identical at every other elevation. This is because, in the invention embodiment now being described, thickness T varies uniformly linearly progressing downwardly along coating 10.

Still considering what is shown in FIG. 1, and turning now to the curved dash-double-dot line 14 which appears adjacent the left side of FIG. 1, this line represents the outer surface of a modified three-layer coating 10 which is characterized in a manner whereby the internal thicknesses of layers 10a, 10b, 10c tend to thicken in a smoothly progressing, but non-linear, fashion, or way—growing thicker as one progresses downwardly vertically relative to container 12. While different, non-linear, overall coating thickness variations may be employed, the variation illustrated by line 14 for the outer surface of layer 10c follows a generally logarithmic curvature. At every vertical location in modified layer 14, the relative per-layer thickness relationships herein are the same as those described above with respect to the structure of layer 10. In other words, the inner and outer layers which correspond to layers 10a, 10c, respectively, have substantially the same thickness at every common elevation, and this thickness is approximately twice that of the thickness of the intermediate layer at the same elevation. The invention may be thought of as liquid-containing structure including a liquid container having an upright wall, which has a top, a bottom, an inside and an outside, wherein the top is located above the bottom thereof, which is designed to contain a selected liquid, and a head-pressure-variant, self-healing, anti-liquid-leak coating structure applied to the outside of the wall possessing a thickness which varies from smaller toward larger, progressing downwardly from adjacent the top of said wall toward the bottom of the wall, in a manner directly related to head pressures which will be created at different elevations vertically along the wall of the container by the selected liquid when that liquid is contained in the container. Alternately, the invention may be considered to be a combination of a container for holding a body of liquid and a coating for the container which coating is applied to the exterior surface of the container, which includes a container having an upright peripheral wall which contains a body of liquid, wherein the body of liquid exerts a head pressure on the container, and wherein the coating, whose thickness, at each elevation along the outside of the coated container wall, and with respect to the body of liquid held in the container, varies in a manner directly related to the head pressure created at different elevations vertically along the wall of the container by the body of liquid when that body of liquid is contained in the container.

Figure 2:
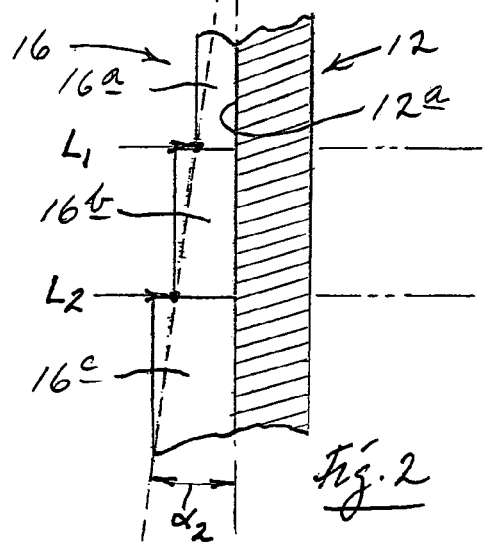
FIGS. 2 and 3 show another modified form of the invention which features a staged, or stepped, thickness protective coating, wherein the ratio T/HP is continuously variant along the vertical dimension of a container wall, but is essentially the same at plural (at least two) vertical locations along the vertical outside of a protected container. Each stage, or step, has essentially a "constant" thickness, and in FIG. 2, the ratio T/HP is substantially identical at the locations therein indicated at $L_1$ and $L_2$.
Figure 3:
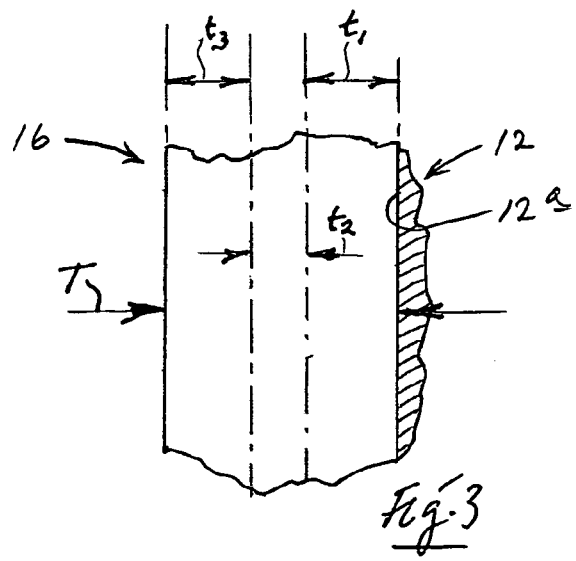

Switching attention to FIGS. 2 and 3 in the drawings, here there is shown, generally at 16, what is referred to herein as a staged, or stepped, protective barrier coating, in which each step, and three such steps are shown in FIG. 2 at 16a, 16b, 16c, the overall layer thickness within such a step, remains substantially uniform throughout the entire vertical height of that step. Thus, the thickness of step 16a is uniform and smaller than the uniform thickness of step 16b, which is smaller than the uniform thickness of step 16c, as one progresses downwardly along the outside of container 12. Within each step, such as within step 16a which is illustrated in a little more detail in FIG. 3, there is present, essentially, the same three-layer coating structure described earlier herein, with the inner and outer layers having thicknesses $t_1$ and $t_3$ that are about the same as one another, with each of these thicknesses being about twice the thickness ($t_2$) of the intermediate layer.

With respect to this FIG. 2/FIG. 3 structure, what one will notice is that, throughout each step, and indeed as one progresses vertically along the outside of container 12, the ratio T/HP, throughout the vertical dimension of each step, is continuously variable, although at the locations of the junctures between vertically next-adjacent steps, as illustrated at $L_1$ and $L_2$ in FIG. 2, the respective ratios T/HP are essentially identical to one another.

As was true with regard to the invention embodiments pictured in and described with respect to FIG. 1 in the drawings, the embodiment illustrated in FIGS. 2 and 3 is one wherein the stepped, or staged, layer structure proposed essentially recognizes the variation in liquid head pressure existing in liquid contained within container 12, but does so in a non-smoothly varying way.

Accordingly, three important embodiments of the invention, useable selectively in different applications, have been described and illustrated herein for implementing features of the present invention. The manners specifically employed to apply, as by spraying, the various layers which make up the illustrated coatings are completely a matter of user choice, and may be entirely conventional in the relevant art. Thus, they are not discussed specifically herein.

Accordingly, while several preferred embodiments of, and manners of implementing, the present invention have been described and illustrated herein, we appreciate that other variations and modifications may be made without departing from the spirit of the invention.

We claim:
1. Varying-thickness, anti-container-puncture-leak barrier structure formed on the vertical outside surface of a container for liquid hydrocarbon fuel comprising
   a self-healing, anti-liquid-leak, hydrocarbon-fuel-reactive material applied as a coating to said surface, and
   as a structural characteristic of said coating, a thickness which varies linearly from smaller toward larger progressing downwardly in the coating along the surface.

* * * * *

UNITED STATES PATENT AND TRADEMARK OFFICE
CERTIFICATE OF CORRECTION

PATENT NO. : 7,901,750 B2  
APPLICATION NO. : 11/416982  
DATED : March 8, 2011  
INVENTOR(S) : Atwood et al.

Page 1 of 1

It is certified that error appears in the above-identified patent and that said Letters Patent is hereby corrected as shown below:

Column 2, line 59, TUFF STUFF® 7FR" should read --TUFF STUFF® FR--; line 65 "diphynylene" should read --diphenylene--.

Column 3, line 11 "alkylslyrene" should read --alkylstyrene--.

Signed and Sealed this  
Nineteenth Day of April, 2011

David J. Kappos  
*Director of the United States Patent and Trademark Office*